(12) United States Patent
May-Weymann et al.

(10) Patent No.: US 9,973,921 B2
(45) Date of Patent: May 15, 2018

(54) CONFLICT DETECTION

(71) Applicant: Nvidia Corporation, Santa Clara, CA (US)

(72) Inventors: Alexander May-Weymann, Sophia Antipolis (FR); Flavien Delorme, Sophia Antipolis (FR)

(73) Assignee: Nvidia Corporation, Santa Clara, CA (US)

( * ) Notice: Subject to any disclaimer, the term of this patent is extended or adjusted under 35 U.S.C. 154(b) by 98 days.

(21) Appl. No.: 14/671,699

(22) Filed: Mar. 27, 2015

(65) Prior Publication Data
US 2016/0286515 A1    Sep. 29, 2016

(51) Int. Cl.
*H04W 8/20*    (2009.01)
(52) U.S. Cl.
CPC .................. *H04W 8/205* (2013.01)
(58) Field of Classification Search
CPC ....... H04W 24/00; H04W 60/00; H04W 8/20; H04W 8/205
USPC .............................................. 455/425, 435.1
See application file for complete search history.

(56) References Cited

U.S. PATENT DOCUMENTS

| | | | | |
|---|---|---|---|---|
| 2008/0090568 A1* | 4/2008 | Venkateswarlu | . | H04M 1/72572 455/432.1 |
| 2009/0124251 A1* | 5/2009 | Niccolini | ................... | G06F 8/61 455/425 |
| 2009/0219205 A1* | 9/2009 | Jazra | ....................... | G01S 19/25 342/357.64 |
| 2013/0109437 A1* | 5/2013 | Kim | ...................... | H04W 8/183 455/558 |
| 2014/0011478 A1* | 1/2014 | Collins | .................. | H04L 43/00 455/411 |

OTHER PUBLICATIONS

"3rd Generation Partnership Project; Technical Specification Group Core Network and Terminals; Universal Subscriber Identity Module (USIM) Application Toolkit (USAT) (Release 12)," 3GPP TS 31.111, V12.6.0, Dec. 2014, 130 pages.
"Universal Mobile Telecommunications System (UMTS); LTE; Characteristics of the Universal Subscriber Identity Module (USIM) application (3GPP TS 31.102 version 12.6.0 Release 12)," ETSI TS 131 102, V12.6.0, Jan. 2015, 255 pages.

(Continued)

*Primary Examiner* — Kamran Afshar
*Assistant Examiner* — Farid Seyedvosoghi

(57) ABSTRACT

A terminal for communication with a communication network and a method of configuring a subscriber identity device are disclosed. In one embodiment, the terminal includes computer storage configured to store a subscriber identity application, a processing unit operable to provide access to the communication network by executing an instance of the subscriber identity application, and a toolkit file assigning a modem of the terminal to handle at least one communication procedure for effecting said communication with the communication network, wherein the transferred terminal profile information assigns a host processor of the terminal to handle at least one communication procedure for effecting said communication with the communication network.

10 Claims, 6 Drawing Sheets

(56) References Cited

OTHER PUBLICATIONS

"3rd Generation Partnership Project; Technical Specification Group Core Network and Terminals; AT command set for User Equipment (UE) (Release 13)," 3GPP TS 27.007, V13.0.0, Mar. 2015, 327 pages.

"Smart Cards; Card Application Toolkit (CAT) (Release 13)," ETSI TS 102 223, V13.0.0, Mar. 2015, 243 pages.

* cited by examiner

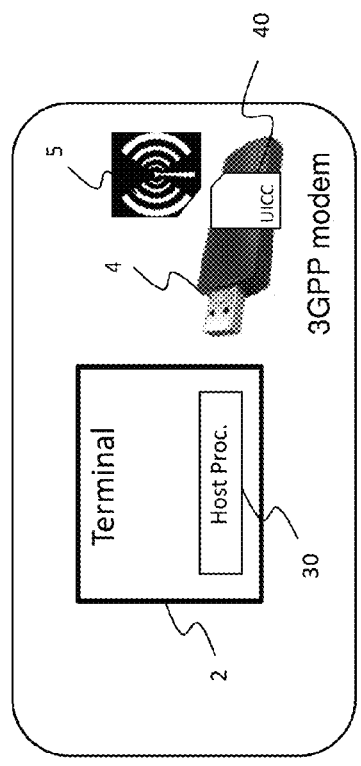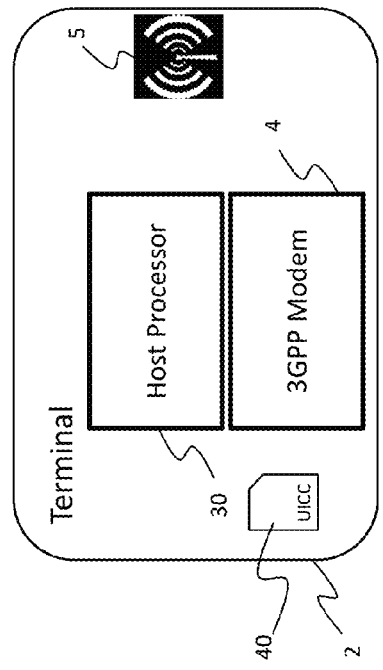
Figure 2A
Figure 2B

CONFLICT DETECTION

BACKGROUND

In a communication system, a device (typically a mobile device) termed user equipment (UE) communicates wirelessly with a radio access network. Communications between the UE and the radio access network may be effected in accordance with a multi-layered communications protocol. A modem (MT) is a device for transmitting and receiving signals in such a system and is used at the UE to communicate with the radio access network. A modem may be integrated in the UE or it may be not be integrated in the UE and may be connected to the UE via a suitable external interface (e.g. USB). In particular, a modem may be used at a UE to connect the UE to a public land mobile network (PLMN) such as a mobile cellular network (i.e. a 3GPP network or other CDMA network). The UE may comprise a "host" or "application" processor (TE) that communicates with the modem and causes it to perform desired tasks.

An example of a communication system is a 3GPP Universal Mobile Telecommunications System (UMTS) which is a cellular system comprising a collection of Node-Bs (base stations) and Radio Network Controllers (RNCs) controlling those Node-Bs. The Node-Bs and RNCs are collectively referred to as UTRAN ("Universal Terrestrial Radio Access Network"). A UMTS system may employ wideband code division multiple access (W-CDMA) radio access technology for communication between UEs and UTRAN.

A Universal Integrated Circuit Card (UICC) may be communicatively coupled to the modem. A UISC is a smart card (that is a physical card with embedded integrated circuits) comprising a CPU ("Central Processing Unit"), computer storage (e.g. ROM, RAM, EEPROM etc.) and input/output (I/O) circuits for communicating with the modem. Typically, the housing of a UE with an integrated modem or the housing of an external modem has a card slot which supports the UISC and communication between the modem and the USIC is effected by way of electrical pin connectors.

A UICC may store an application such as a Universal Subscriber Identity Module (USIM)—see e.g. 3GPP TS 31.102—which provides access to a UMTS network in the following manner. The USIM application is similar in some respects to the Subscriber Identity Module (SIM) application defined in GSM standards.

The USIM holds a unique International Mobile Subscriber Identifier (IMSI) and an associated unique authentication key K assigned by an operator of the network. Typically, the IMSI can be obtained via the UICC I/O, but not the key K which remains contained within the UICC. In order to gain access to the network, the IMSI is transmitted to the network. In response, the network generates a random number RAND which it sends to the UE and also signs with the key K, generating a first value. Once received, RAND is passed to the USIM application which signs it with the key K, generating a second value. The second value is returned to the network and, if the received second value matches the first value generated by the network, access to the network is granted, e.g. thereby enabling the UE to establish calls, transfer data etc.

Communication between the host and the modem can be implemented using protocols provided by the 3GPP specifications. In particular, communication between the modem and the host can be effected using an attention (AT) command port. For instance, the host processor may assert a particular AT command to cause the modem to perform a desired operation.

For instance, during booting up of the modem, the host uses an "AT+CUSATx" (e.g. x=W to write to the UICC, x=R to read from the UICC) AT commands (see e.g. 3GPP TS27.007) to configure which proactive STK ("SIM Application Toolkit) commands and STK procedures should be handled by the MT (modem) and which ones should be handled by the TE (AP/Host).

The STK is a GSM standard which enables the SIM application to proactively initiate commands to the modem (i.e. of its own volition rather than in response to a command received at the UICC e.g. from the modem) used for value-added (non-core) services above and beyond the core services (which includes voice calls) provided by the UMTS system. By initiating such commands of its own volition, the SIM application (as opposed to the host) is thus able to handle particular STK services. Similarly, the USAT (USIM Application Toolkit) is a UMTS standard analogous in some respects to STK but for the USIM application (rather than the SIM application), and enables similar proactive behaviour by the USIM application in relation to non-core services by enabling the USIM.

Responsive to an AT+CUSATR command from the host, the modem reads from the UICC which procedures the UICC is currently configured to handle. Conversely, responsive to an AT+CUATW command from the host, the modem writes to UICC to alter this configuration as described in further detail below.

This is done before the SIM (or USIM) application is activated by transferring a "Terminal Profile" (TP) to the UICC. The TP comprises a plurality of bit indicators, each bit corresponding to a particular procedure and being used to indicate whether the MT (modem) or the TE (host) is going to handle that procedure. In this way, the host can dictate what procedures the MT is going to handle and what procedures it is not going to handle. This is effected by the TE writing to specific TP bits of a bit stream of the UICC by instigating an "AT+CUSATW=0, . . . " to the modem (with the "0" indicating a "0" should be written to a particular bit of the bit stream to indicate that the host, and not the modem, will handle the corresponding procedure i.e. the procedure corresponding to that particular bit). The proactive commands and procedures (or services) relating to the specific TP bits are defined in ETSI 102.223. As an example if you want the four proactive commands "DISPLAY TEXT; GET INKEY; GET INPUT; PLAY TONE" to be handled by the TE host, then this would be effected by the TE host supplying the AT command "AT+CUSATW=0,000017" to the MT modem. Here, the 4 bits are activated (on byte 3 of the Terminal Profile) representing the support of the four proactive commands to be handled by the TE host.

However, in accordance with various 3GPP Technical Specifications (e.g. TS 31.111), the host is encumbered in this respect by an "MT only profile" ("MT only TP") stored at the UICC. The "MT only profile" also comprises a plurality of bit indicators, each of which defines a procedure which the MT must handle (that is, which are considered to be an intrinsic part of MT operation) and which the host is not free to handle even if it has the capability to do so. The SIM (or USIM) application and the UICC only sees the TP information transferred by the host; the knowledge about whether the TE (host) or the MT (modem) is going to handle a particular procedure is in the modem. Thus the modem itself checks that no "MT only profile" bit is active in a "Terminal profile" (TP). In accordance with 3GPP procedures, the host should transfer Terminal Profile information to the UICC which conflicts with the "MT only profile". That is, the host should not instigate a "AT+CUSATW=0, . . . " command to the modem that would modify the Terminal Profile of the UICC in a way that conflicts with the "MT only profile" of that UICC (e.g. it should not instigate a command that modifies the TP to assign the host to handle a particular procedure that the "MT only profile" assigns to the modem to handle).

The host may use an "AT+CUSATR=5" command to read all the TP bits which are only possible for the MT (that is, bits which correspond to procedures which the "MT only profile" dictates be handled by the modem and not by the terminal).

Previously, 3GPP TS 31.111, specified the "MT only profile" and indicated that it should be hardcoded in the UICC. But this changed with "CR467 of TS 31.102—Addition of an EF for USAT facility control". Now the "MT only profile" can be stored in a SIM file (specifically, an Elementary File for USAT Facility Control: EF_UFC, as set out in TS 31.102). The EF_UFC is an example of a "toolkit file" as the term used herein.

SUMMARY

The disclosure provides a method of configuring a subscriber identity device for use at a terminal for communication with a communication network. In one embodiment, the subscriber identity device includes computer storage configured to store a subscriber identity application, a processing unit operable to provide access to the communication network by executing an instance of the subscriber identity application, and a toolkit file assigning a modem of the terminal to handle at least one communication procedure for effecting said communication with the communication network and the method includes: (1) transferring terminal profile information to the subscriber identity device, the terminal profile information assigning a host processor of the terminal to handle at least one communication procedure for effecting said communication with the communication network, (2) selecting the subscriber identity application for execution on the processing unit of the subscriber identity device, following said execution, (3) accessing the tool kit file to detect whether or not there exists a conflict between the procedure assigned to the modem and the procedure assigned to the host processor, and (4) transferring updated terminal profile information to the subscriber identity device to resolve that conflict when detected.

In another aspect, the disclosure provides a terminal for communication with a communication network. In one embodiment, the terminal includes: (1) an interface for connecting to a modem and (2) a host processor configured to transfer terminal profile information to a subscriber identity device for use at the terminal, the subscriber identity device comprising computer storage configured to store a subscriber identity application, a processing unit operable to provide access to the communication network by executing an instance of the subscriber identity application, and a toolkit file assigning the modem to handle at least one communication procedure for effecting said communication with the communication network. In this embodiment, the transferred terminal profile information assigns a host processor of the terminal to handle at least one communication procedure for effecting said communication with the communication network and the host processor is further configured to select the subscriber identity application for execution on the processing unit of the subscriber identity device and, following said execution, access the tool kit file to detect whether or not there exists a conflict between the procedure assigned to the modem and the procedure assigned to the host processor, and transfer updated terminal profile information to the subscriber identity device to resolve that conflict when detected.

BRIEF DESCRIPTION OF FIGURES

FIG. 2A is a schematic illustration of a first configuration of a user equipment;

FIG. 2B is a schematic illustration of a second configuration of a user equipment;

DETAILED DESCRIPTION

Figure 1:
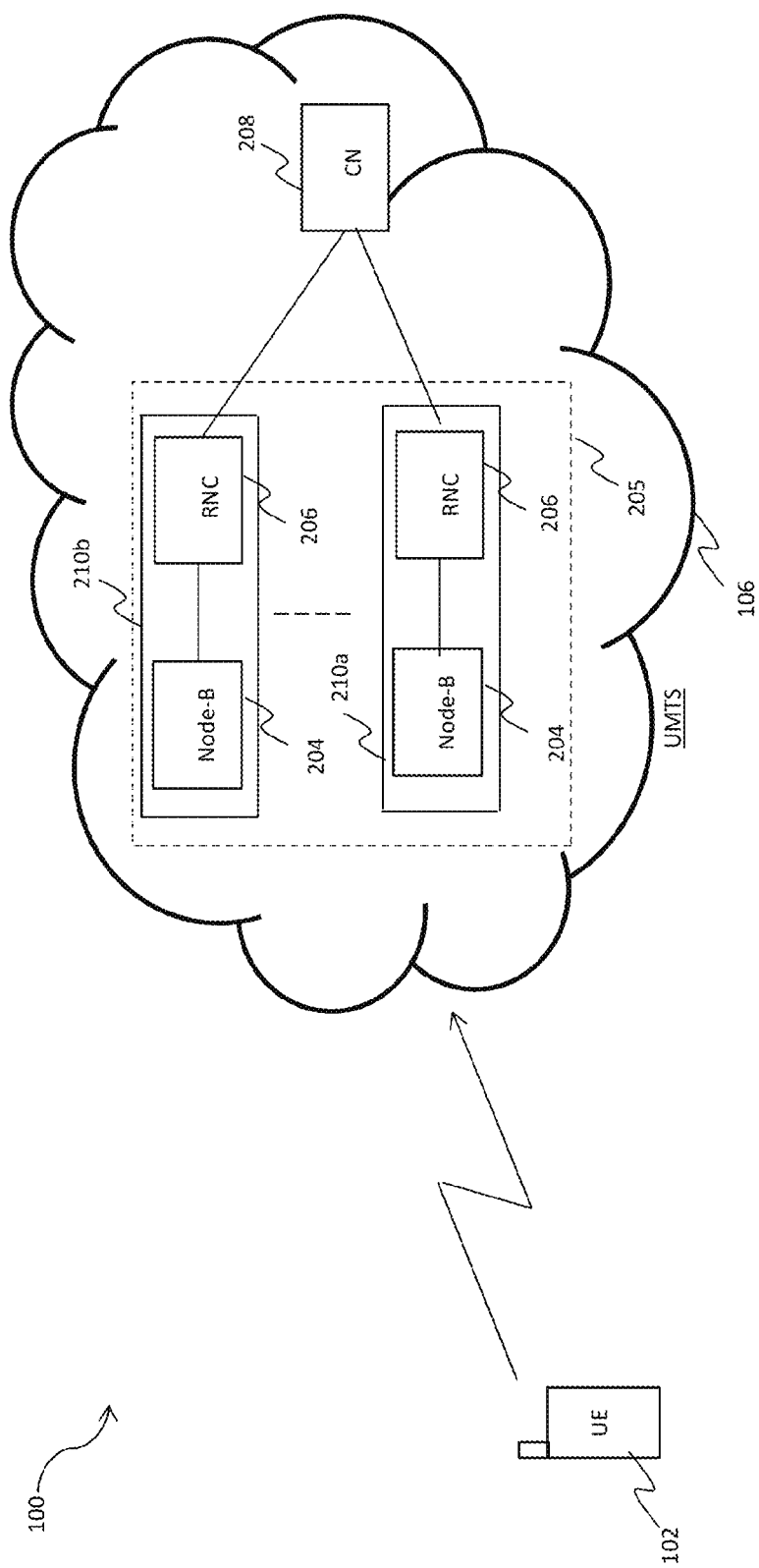
FIG. 1 is a schematic illustration of a communication system.

In accordance with 3GPP procedures, the Terminal Profile (TP) download is one of the first things to do on a UICC and the TP configuration should be completed before the SIM (or USIM) is selected and executed on the UICC. Thus the UICC has the has the ability to change its behaviour based on the content of the downloaded Terminal Profile. Such downloading of Terminal Profile information provides a mechanism for the TE (host) to communicate to the UICC what it is capable of.

The present disclosure recognizes that the EF_UFC is stored in the USIM application and is therefore not available before the UICC is accessible and the USIM application is selected. That is, after the UICC is activated, the host searches the UICC for a USIM application stored on the UICC. There may be multiple applications stored on the UICC at any one time, e.g. CSIM, SIM, EAP, JAVA, USIM, ISIM. When the USIM application has been found, the host selects it for execution on a CPU of the UICC. As the selected USIM application is started up, a user of the TE may be prompted to enter a Personal Identification Number (PIN). Only after this procedure can the "toolkit file" (e.g. EF_UFC file) be read. Thus the USIM application must be selected and started before the toolkit file can be accessed. But at this point of time the whole TP configuration must have taken place already.

Thus, the present disclosure identifies a discrepancy in the current 3GPP Standard documentation as according to that documentation: 1) the host can't access the toolkit file until after the USIM application has been enabled on the UICC; but 2) the terminal profile has to be downloaded before the USIM application is enabled i.e. presently, the terminal profile (assigning the host to handle procedure) needs to be downloaded before the toolkit file (identifying procedures which the host should not handle) can be read by the host.

The present disclosure thus recognizes the possibility of conflicts occurring in implementations of (e.g.) CR467 of TS 31.102, namely conflicts between the toolkit file (that is the "MT only profile") and the Terminal Profile information transferred to the modem before the booting and thus before the toolkit file can be read (that is, what has been set by "AT+CUSATW=0, . . . "). In other words, when the host tells the UICC which procedures it is going to handle itself (by transferring terminal profile information), the host has no way of knowing whether it is free to handle those procedures; that is, it has no way of knowing whether the UICC actually permits the host to handle those procedures as this information is stored in the toolkit file which is inaccessible to the host until after it has transferred the terminal profile information.

Disclosed is a method of configuring a subscriber identity device for use at a terminal for communication with a communication network, the subscriber identity device comprising computer storage configured to store a subscriber identity application, a processing unit operable to provide access to the communication network by executing an instance of the subscriber identity application, and a toolkit file assigning a modem of the terminal to handle at least one communication procedure for effecting said communication with the communication network, the method comprising: transferring terminal profile information to the subscriber identity device, the terminal profile information assigning a host processor of the terminal to handle at least one communication procedure for effecting said communication with the communication network; selecting the subscriber identity application for execution on the processing unit of the subscriber identity device; following said execution, accessing the tool kit file to detect whether or not there exists a conflict between the procedure assigned to the modem and the procedure assigned to the host processor, and transferring updated terminal profile information to the subscriber identity device to resolve that conflict when detected.

In one embodiment, the terminal profile information and the updated terminal profile information is transferred to the subscriber identity device by instigating at least one respective write command to a modem, responsive to which the modem writes the terminal profile information to the subscriber identity device.

According to another embodiment, each respective write command is an AT command.

According to another embodiment, each respective write command is an AT+CUSATW command.

According to another embodiment, the toolkit file is accessed by instigating one or more read commands to a modem, responsive to which the modem reads the toolkit file on the subscriber identity device.

According to another embodiment, the read commands are AT commands.

According to another embodiment, the read commands are AT+CUSATR commands.

According to another embodiment, the communication network is a UMTS network and the application is one of a USIM application and an ISIM application.

According to a second aspect of the disclosure there is provided at least one computer readable medium storing executable code configured when executed to implement the above disclosed method.

According to a third aspect of the present disclosure there is disclosed a terminal for communication with a communication network comprising: an interface for connecting to a modem; a host processor configured to transfer terminal profile information to a subscriber identity device for use at the terminal, the subscriber identity device comprising computer storage configured to store a subscriber identity application, a processing unit operable to provide access to the communication network by executing an instance of the subscriber identity application, and a toolkit file assigning the modem to handle at least one communication procedure for effecting said communication with the communication network; wherein the transferred terminal profile information assigns a host processor of the terminal to handle at least one communication procedure for effecting said communication with the communication network; and wherein the host processor is further configured to select the subscriber identity application for execution on the processing unit of the subscriber identity device and, following said execution, access the tool kit file to detect whether or not there exists a conflict between the procedure assigned to the modem and the procedure assigned to the host processor, and transfer updated terminal profile information to the subscriber identity device to resolve that conflict when detected.

Particular embodiments involve checking the profile set by "AT+CUSATW=0, . . . " with the one returned by "AT+CUSATR=5" for any possible conflicts, after the EF_UFC file is available (the point that which the USIM application selected at the earliest). In the current 3GPP standard it is only defined that a check for conflicts is made at the point of time when setting the TE profile by "AT+CUSATW=0, . . . ".

Once the EF_UFC file has been read in this manner, the application/TE adapts the settings of "AT+CUSATW=0, . . . " (to assign procedures to the host) and "AT+CUSATW=1, . . . " (to assign procedures to the modem) to take EF_UFC into account and resolve possible conflicts. This is discussed in further detail below.

First, a content in which embodiments can be usefully deployed will be described with reference to FIG. 1. FIG. 1 is a schematic illustration of a communication system, generally denoted by reference numeral 100. It will be understood that in FIG. 1 only sufficient elements of the system are shown in order to present the context of some of the arrangements of the disclosure.

The communication system 100 comprises a wireless communications device termed user equipment (UE) 102. The user equipment 102 may be a mobile telephone, a personal digital assistant (PDA), a computer or any other device that exchanges data wirelessly. The UE 102 is in communication with a communication network 106. The network 106a is a 3G UMTS communication network.

The UMTS network 106 comprises a UMTS Terrestrial Radio Access Network (UTRAN) 205 and a core network 208. The UTRAN 105 comprises one or more radio network sub-systems 210a,210b. A radio network sub-system is a sub-network within the UTRAN 205 and comprises a base station 204 (termed node-B) and a radio network controller (RNC) 206. A node-B 104 is a transceiver which sends and receives wireless signals and defines a cell region. A RNC 206 is the network element responsible for the control of the radio resources of the UTRAN 205. A dedicated physical channel is established between the UE 202 and the node-B 204 to allow data communication to take place there between. It will be appreciated that a plurality of UEs and radio network sub-systems may be present in the UTRAN 205, which for clarity purposes are not shown. The UTRAN 205 is in communication with the core network 108.

The structure of a UMTS network 106 as illustrated in FIG. 1 is well-known to one skilled in the art, and the further operation of such a system is not described herein.

FIG. 2A is a schematic block diagram of an example configuration of user equipment 102. As shown in FIG. 2A the user equipment 102 comprises host terminal 2 and a modem 4. The host terminal 2 may be a user terminal, and may for example take the form of a desktop computer, laptop computer, tablet style computer, or mobile phone (which may be referred to as a "smart phone"). As shown in FIG. 1a, the modem 4 may for example take the form of a dongle for plugging into the host terminal 2 such that the modem 4 is connected to a host processor 30 (otherwise referred to as an application processor) of the host terminal 2. Alternatively the modem 4 may take the form of a mobile phone handset which, as well as being a conventional mobile telephone, can be connected to the host terminal 2 so as to act as an external cellular modem for the host terminal 2. As shown in FIG. 2A, the modem 4 may be external to the host terminal 2 in that it is a separate unit housed in a separate casing, but which is connected or connectable to the host processor 30 of the host terminal 2 by means of a wired or wireless connection (as well as being removable or being able to be disconnected from the host terminal 2).

FIG. 2B is schematic block diagram of another example configuration of user equipment 102. As shown in FIG. 2B, the modem 4 may be internal to the host terminal 2, e.g. taking the form of a wireless module in the host terminal 2. For example, both the modem 4 and host processor 30 may be housed within the same casing of the host terminal 2. For example the modem 4 may be internal to a mobile phone 2, and connected to the host processor 30 of the mobile phone 2 by way of a wired connection.

In the configuration of FIG. 4A, the casing of the modem 4 is configured to mechanically support a removable UICC 40. In the configuration of FIG. 4B, the casing of the terminal 2 is similarly configured to support the UICC 40.

The UICC is in the form of a removable "smart card"—that is, a plastic (or similar) card containing embedded integrated circuits and electrical connectors for connecting to corresponding electrical pins embedded in the casing of the modem/terminal. The connectors and pins constitute respective interfaces of the UICC and the terminal/modem (see below). The casing of the modem/terminal supports the UICC by way of a card slot configured to mechanically support the UICC to maintain a respective electrical connection between each connector of the UICC and its corresponding pin embedded in the modem/terminal casing.

The modem 4 comprises a first interface 31. With reference to FIG. 2A, the first interface may comprise a wireless transceiver, typically in the form of a radio frequency (RF) transceiver and an antenna 5 for receiving and transmitting electromagnetic signals over-the-air between the UE and the UMTS network 106a. The first interface of the modem 4 connects via Node-B 104 enabling the modem 4 to establish a channel between itself and the UTRAN 105. With reference to FIG. 2B, the first interface may comprise a wired connection to an interface on the host terminal. The interface on the host terminal may comprise a wireless transceiver, typically in the form of a radio frequency (RF) transceiver and an antenna 5. The interface on the host terminal 2 connects via Node-B 104 enabling the modem 4 to establish a channel between itself and the UTRAN 105.

The modem 4 communicates with the UTRAN 105 in accordance with multi-layered a radio interface protocol architecture, details of which are well known in the art.

The modem 4 also comprises a second interface (host interface) 32 for connecting to the host processor 30 on the host terminal 2. With reference to FIG. 2A, the second interface 32 between the host processor 30 and modem 4, could for example comprise a wired connection such as USB, or a short-range wireless transceiver such as an infrared connection or a radio frequency connection (e.g. Bluetooth). With reference to FIG. 2B, the second interface 32 between the host processor 30 and modem 4, could for example comprise a wired connection within the host terminal 2. Communication between the modem 4 and the host 30 via the second interface 32 is effected at least in part by the host 30 instigating AT (ATtention) commands to the modem 4 via the second interface 32. This is discussed in further detail below.

Figure 3:
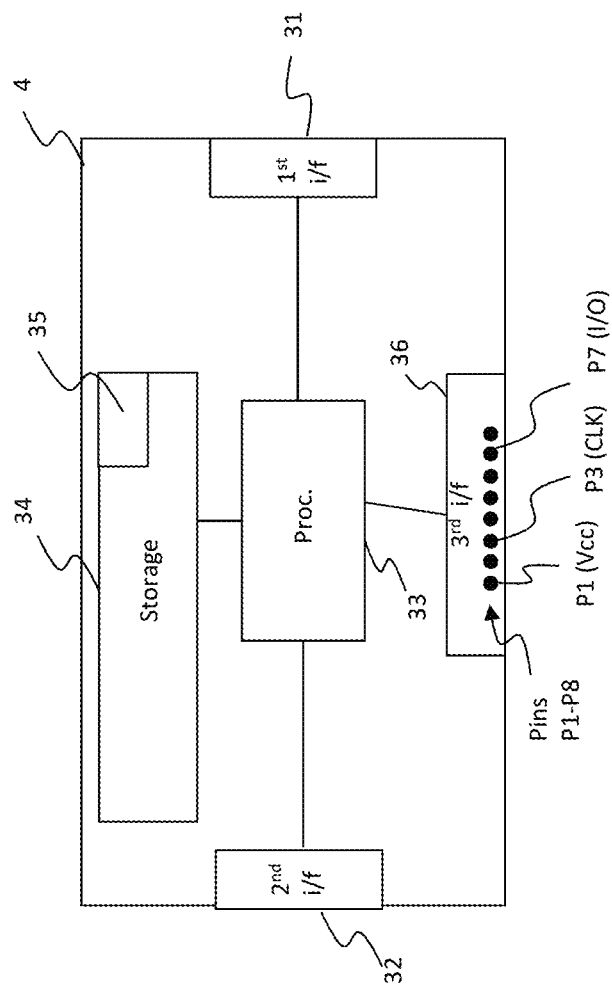
FIG. 3 is a schematic block diagram of a modem.

The modem 4 also comprises a third interface (UICC interface) 36 for connecting to the removable UICC 40. The interface 36 comprises eight electrical pins (P1-P8) (corresponding to eight connectors C1-C8 of the UICC) in the example of FIG. 3, but may alternatively comprise more or fewer pins. As discussed, the pins are embedded either in the modem casing (FIG. 2A) or terminal casing (FIG. 2B) for connection to the corresponding respective connectors C1-C8 of the UICC 40. Each electrical pin has a distinct function. In particular, a first pin P1 proves a supply voltage Vcc to the UICC for powering the UICC, a third pin P3 provides a clock signal CLK for clocking the UICC, and a seventh pin P7 supplied data and receives data from to the UICC 40.

Figure 4:
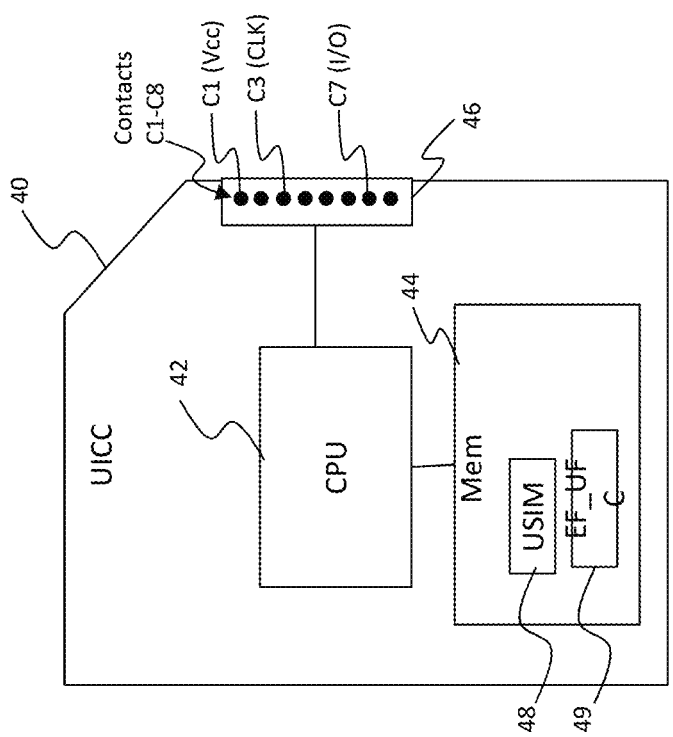
FIG. 4 is a schematic block diagram of a subscriber identity device.

The modem 4 may comprise additional interfaces not shown in FIG. 4. For instance, the modem may comprise a fourth (network) interface (not shown) for connecting to an IP-based network (e.g. a WiFi network).

FIG. 4 is a schematic illustration of a UICC (smart card) 40. As shown in FIG. 4, the integrated circuits of the UICC comprise a CPU ("Central Processing Unit") or processor 42, memory (computer storage) 44 and an interface 46 for connecting to the modem 4. The memory may comprise different types of memory such as a combination of ROM, RAM, and EEPROM. The memory 44 holds a subscriber identity application 48 for accessing a communication network according to a particular radio access technologies (RATs). In this embodiment, the application 40 is a USIM application for accessing the UMTS network 106.

The memory 44 also holds a tool kit file 49 assigning the modem 4 to handle one or more communication procedure(s) for effecting a certain type of communication with the network 106 (e.g. as part of a non-core service). That is, the toolkit file 49 identifies one or more communication procedures which are to be handled by the modem 4 (and not the host 30) when the terminal 102 is communicating with the network 106. In one embodiment, the tool kit file is only accessible from outside the UICC 40 once the subscriber identity application 48 has been selected and started up (executed) on the CPU 42, as explained in more detail below.

An example of a toolkit file is the EF_UFC file described above.

The UICC is an example of a subscriber identity device operable to execute (on the CPU) a subscriber identity application (USIM).

Communication between the modem 4 and the UICC 42 is based on the Standardized specifications and is described, for instance, in ETSI TS 102 221, "Smart Cards; UICC-Terminal interface; Physical and logical characteristics". At the physical level, commands to the UICC are delivered to connector C7 of the UICC (from pin P7) as 10 bit characters, each bit encoded as one of a high or low voltage on the connector 7, constituting 8 data bits, 1 start bit (which always has the same value—one of high or low), and 1 even parity check bit. Characters are supplied in character frames starting with the start bit, followed by the data bits starting with the most significant data bit, and ending with the parity bit. Successive character frames are separated by guard intervals. See e.g. section 7.2.1. of TS 102 221.

In particular, the modem 4 can instigate various commands to the UICC 40 to:

1) transfer terminal profile information, received from the host 30 (as an AT+CUSATW command—see above), to the UICC 40; and 2) access the toolkit file 49 providing it is currently accessible (e.g. responsive to a AT+CUSATR from the host 30—see above).

Figure 5:
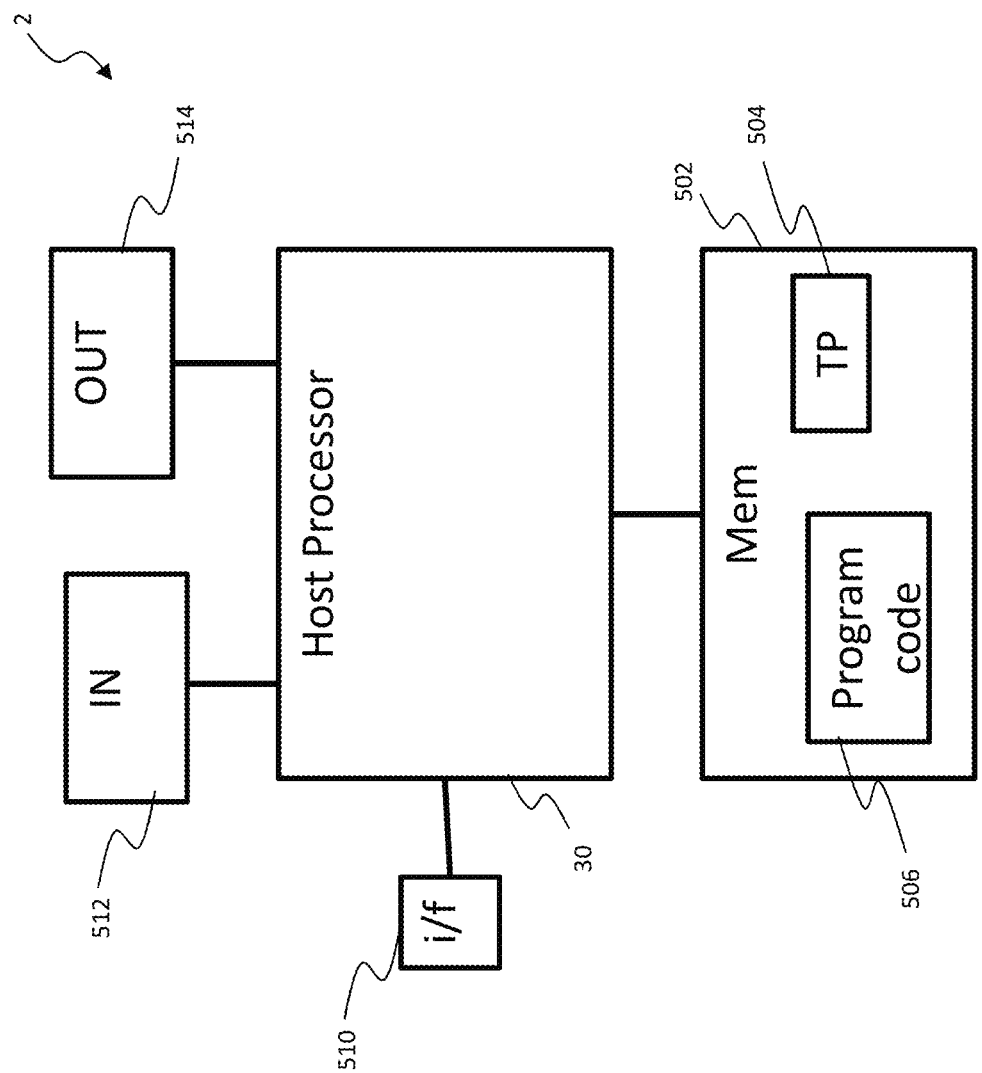
FIG. 5 is a schematic block diagram of a terminal.

The terminal 2 is shown in further detail in FIG. 5. As shown, the terminal 2 comprises the host processor 30 to which is connected memory (computer storage) 502, a modem interface 510, one or more input devices 512 and one or more output devices 514. The modem interface is for connecting to the modem via the corresponding interface 31 of the modem. The interface 510 (of the host) and the interface 32 (of the modem) are of the same type (e.g. USB, wireless, hardwired etc.). The host is operable to receive user inputs from a user of the terminal 2 via the input components 512 (which may comprise one or more of a touchscreen, camera, keypad, microphone etc.) and to output information to a user via the output components 514 (which may comprise one or more of a display screen e.g. the touchscreen, loudspeaker etc.).

The memory 502 holds program code for execution on the host processor 30 such as operating system code for managing hardware resources of the terminal 2 and one or more software application for performing useful tasks above and beyond the mere running of the terminal 2. This includes program code operable when executed to instigate various AT commands to the modem via the interface 410. In this way, the host 30 controls operation of the modem 4. The UICC 40 is not directly accessible to the host 30 but the host 30 can instruct the modem 4 to obtain information from/supply information to the modem 4 by instigating appropriate AT commands, such as the AT+CUSATW and AT+CUSATR commands described above. For instance, the host 30 can obtain desired information form the toolkit file 49 on the UICC by instigating an AT+CUSATR to the modem, responsive to which the modem access the toolkit file 49 (provided it is accessible at that time) to obtain the desired information and supplies that information to the host 30 by way of a response to the AT+CUSATR command.

The memory 502 also holds terminal profile information 504. The terminal profile information identifies one or more procedures to be handled by the host 30 and/or one or more procedures to be handled by the modem 4. The terminal profile 402 is accessible to, and modifiable by, program code running on the host 30. Information from the terminal profile can be supplied to the modem by way of AT+CUSATW commands in the manner described above for delivery by the modem 4 to the UICC 40. The Terminal Profile (TP) mentioned above is one example of terminal profile information.

The toolkit file 49 and the terminal profile information 504 each comprise a respective bit stream wherein each respective bit corresponds to an assignment of a particular procedure—i.e. where a bit corresponding to a procedure is set to "1" in the toolkit file 49, this assigns that procedure to the modem (not the host)—this should not be countermanded by the host (e.g. by instigating an AT+CUSATW= 0, . . . command for that bit) as discussed above. That is, a "1" in the toolkit file represents an "modem (MT) only" assignment of the corresponding procedure. Thus, where a bit of the terminal profile information 504 corresponding to that same procedure is set to "0" (assigning that same procedure to the host), this represents a conflict between the toolkit file and the terminal profile information.

Figure 6:
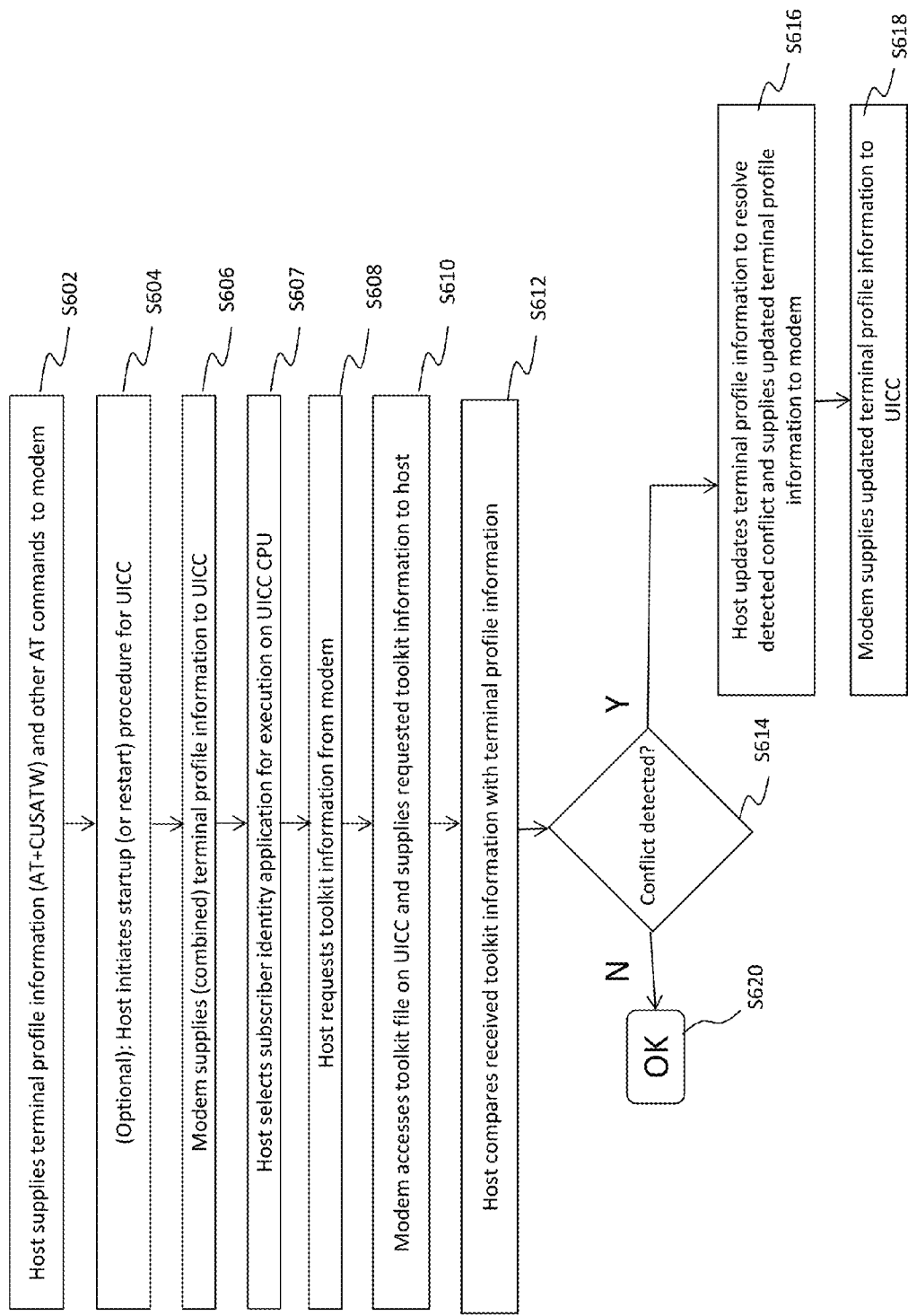
FIG. 6 is a flowchart for a method of configuring a subscriber identity device.

The present disclosure provides a method of configuring the UICC which ensures that any such conflicts are detected and resolved. The method will now be described with reference to FIG. 6 which is a flow chart for the method.

During booting up of the modem 4, the host 30 uses a series of AT commands to configure which toolkit commands and procedures should be handled by the MT (modem) 4 and which ones should be handled by the host. First, at S602, the host 30 supplies terminal profile information 504 to the modem 4 by way of one or more AT+CUSATW commands. For instance, for all communicating procedures that the host is assigned to handle, the host can instigate a "AT+CUSATW=0, . . . " indicating that a "0" is to be written to the corresponding terminal profile bits of the UICC by the modem (the "0" indicating that the host and not the modem is to handle the corresponding procedure(s)). The host can also instigate a "AT+CUSATW=1, . . . " indicating that a "1" is to be written to the corresponding terminal profile bits of the UICC by the modem (the "1" indicating that the modem and not the host is to handle the corresponding procedure(s)). Thus modem 4 may receive two separate Terminal Profiles from the host 30. The host 30 will usually supply both the "AT+CUSATW=0" and "AT+CUSATW=1" AT commands to the modem 4 because it is possible that some procedures will not be supported by either the modem 4 or the host 30. By using a simple OR function, the modem 4 combines the respective bits of the two Terminal Profiles (based on the "AT+CUSATW=0" and AT+CUSATW=1" AT commands), resulting in a combined Terminal Profile (combined TP) ready for downloading to the UICC 40.

Next, the host 30 supplies a "AT+CUSATA=1" Activate USAT profile AT command to the modem 4. This indicates that the host 30 is ready for handling the toolkit file 49 (e.g. EF_UFC). The host then supplies a "AT+CUSATD=1,0" command to the modem 4 which indicates that as part of the next startup (or restart) of the UICC 40, the (combined) TP at the modem 4 shall be downloaded to the UICC 40.

At S604, host 30 supplies an optional "AT+CFUN=0", "AT+CFUN=1" cycle of commands to the modem 4 which leads to a startup (or restart) procedure for the UICC being initiated. The "AT+CFUN=0/1" cycle is typically done immediately after the AT+CUSATx commands described above in S602, in order to restart the UICC 40 so that modifications in the (combined) TP can be taken into account. However, it should be noted that some UICCs support multiple Terminal Profile downloads while being in the "CFUN=1" state. In this case it is possible that modifications in the Terminal Profile can be taken into account by directly downloading an updated Terminal Profile and without needing to restart the UICC.

Next, at S606, the (combined) terminal profile information is supplied by the modem 4 (i.e. downloaded) to the UICC 40 e.g. by writing a "0" or a "1" to each of the TP bits of the UICC 40 identified in the "AT+CUSATW . . . " commands as described at S602. An "AT+CUSATS" command is provided from the modem 4 to the host 30 to indicate when the (combined) TP has actually been downloaded to the UICC 40.

When the UICC 40 is active (MT modem is in the CFUN=1 state) and after the TP profile has been downloaded to the UICC (at S606), the host 30 will search memory 44 of the UICC and select a stored subscriber identity application 48 for execution on the CPU 42, S607. The selected subscriber identity application 48 may be either a USIM or ISIM application. The CPU 42 starts up (executes) the selected subscriber identity application 48, with the ultimate aim of allowing the modem 4 to gain access to the UTMS network 106. A user of the TE (host) may be required to enter a PIN for the selected subscriber identity application 48 when it is started up (executed) on the CPU 42. It then takes some time for the modem 4 to read all the SMS records, phone book records, toolkit file 49 (e.g. EF_UFC) from memory 44; once this startup procedure for the UICC application (e.g. UISM) is complete, the modem 4 supplies another indication to the host 30. This indication is specific to each mobile manufacturer, as there is not one defined in the current 3GPP standard; in the present disclosure for example, the indication "% ISIMINIT" can be used. This "% ISIMINIT" indication is now the trigger for the host 30 to check whether there are conflicts in the Terminal Profile by using an "AT+CUSATR=5" command, as explained in more detail below.

At S608, the host 30 requests toolkit information from the modem 4. For instance, the host may request this information by instigating a "AT+CUSATR=5" command to the modem 4. Because the subscriber identity application 48 has been started on the UICC at this point, the toolkit file 49 on the UICC 40 is accessible to the modem 4. Responsive to the AT+CUSATR command, the modem identifies (S610) from the UICC all of the terminal profile bits indicated by the toolkit file as "MT only" (that is, identifies all the procedures which are assigned to be handled by the modem 4 and not the host terminal 30 by the toolkit file 49) and conveys this to the host 30 by way of a response to the AT+CUSATR command. That is, at S610, the modem accesses the toolkit file 49 on the UICC and supplies the requested toolkit information to the host 30.

At S612, the host 30 compares the received toolkit information with the terminal profile information 504, as supplied to the modem 4 for delivery to the UICC 40 at the earlier step S602, in order to determine whether or not there exists a conflict between the now-accessible toolkit information obtained by the modem 4 and the terminal profile information 504 previously delivered to the UICC 40. For instance, the host 30 may perform a bitwise comparison by reading, for each toolkit bit set as "1" (modem only) corresponding to a respective procedure, the corresponding terminal profile bit corresponding to that same procedure—if that terminal profile bit is "0" (representing an assignment of the procedure to the host), that represents a conflict between the toolkit file and the terminal profile information which the host 30 resolves by resetting any such terminal profile bits to "1" by instigating an "AT+CUSATW=1, . . . " for that particular terminal profile bit. That is, at step S614 the host 30 detects whether there exists one or more conflict(s) between the toolkit file 49 and the terminal profile information 504. If conflict(s) are detected, the host updates (S616) terminal profile information to resolve those conflicts and supplies the updated terminal profile information to the modem 4. In response, the modem supplies the updated terminal profile information to the UICC 40 to resolve the conflict(s) and the method ends.

Supplying the updated terminal profile information to the UICC 40 may or may not require the UICC to be restarted. For example, if the TE host 30 has a particular TP bit activated (set as "0") which conflicts with the corresponding toolkit file 49 bit (MT "modem only", set as "1"), then if the related service can be provided by the modem 4 instead (from a software version point of view), then no new TP will need to be downloaded to the UICC. The bit in question is reassigned from the Terminal Profile to the "MT only profile". However, if the related service for the bit in question cannot be provided by the MT modem 4, an updated Terminal Profile is needed to inform the UICC that the particular service cannot be supported by the UE at all (i.e. neither the host 30 nor the modem 4 will support the service; TE: not allowed, MT: no good SW). In this case it depends if the new TP can be directly downloaded, although this is normally not supported by most available UICCs. So in this case, a UICC restart cycle must be performed (see S604 above).

If no conflicts are detected at S614 however, the method simply ends at S620.

As one example, the toolkit file 49 (e.g. STK or USAT) on the subscriber identity application 48 (e.g. (U)SIM) starts a procedure by sending a request to the MT modem 4, e.g. "Please display: WELCOME TO CHINA MOBILE". Then the MT modem 4 checks if "Please display: (text)" is to be handled by the modem 4 (MT only profile) or by the host 30 (Terminal Profile). In this example, the MT modem sees that the corresponding bit for the "Please display: (text)" is active in the Terminal Profile (i.e. is set to "0") and forwards the original toolkit file request to the host interface 32 (second interface). This causes a "AT+CUSATP . . . " AT command to be sent from the modem 4 to the host 30. Once the text is displayed on the screen of the UE, the host 30 will send a "AT+CUSATT" AT command to the modem 4; terminal response: "message displayed". The modem 4 then forwards this response back to the (U)SIM application. Thus in this example, the host 30, modem 4 and subscriber identity application 48 are all utilised.

As a second example, the toolkit file 49 (e.g. STK or USAT) on the subscriber identity application 48 (e.g. (U)SIM) starts a procedure by sending a request to the MT modem 4, e.g. "Please provide current location". Then the MT modem 4 checks if "Please provide current location" is to be handled by the modem 4 (MT only profile) or by the host 30 (Terminal Profile). Normally, a current location service is handled by the MT modem (MT only profile). Therefore by default, the MT modem 4 will not provide any indication to the TE host 30 and instead provide the information back to the (U)SIM: e.g. "AT&T network, LTE, cell: XYZ". In this scenario only two parties are involved, the MT modem 4 and the (U)SIM application.

Configuring STK (or USAT) is important for network operators to be able to offer better service to the end users. Incorrect handling should be avoided whenever possible. The disclosure notes that the Android® operating system is currently using the AT+CUSATx interface, so it could be wrongly configured in the manner discussed above when executed on a host or application processor.

It will be appreciated that the above embodiments have been described only by way of example, and other variants or applications may be apparent to a person skilled in the art given the disclosure herein.

For instance, while embodiments above have been described in relation to certain standards such as 3GPP UMTS networks and so forth, these are not intended to be limiting and the present disclosure may in fact be applied within any communication standard of any communication network.

Further, although the above has been described in terms of a substantially soft modem implementation, other implementations where more or even all of the described functions (e.g. that of the actuation component 52) are implemented in dedicated hardware are not excluded.

The present disclosure is not limited by the described examples but only by the following claims.

The above-described methods or at least part thereof may be embodied in or performed by various conventional digital data processors, microprocessors or computing devices, wherein these devices are programmed or store executable programs of sequences of software instructions to perform one or more of the steps of the methods. The software instructions of such programs may be encoded in machine-executable form on conventional digital data storage media, e.g., magnetic or optical disks, random-access memory (RAM), magnetic hard disks, flash memories, and/or read-only memory (ROM), to enable various types of digital data processors or computing devices to perform one, multiple or all of the steps of one or more of the above-described methods. Additionally, an apparatus may be designed to include the necessary circuitry to perform at least some of the steps of the methods.

Portions of disclosed embodiments may relate to computer storage products with a non-transitory computer-readable medium that have program code thereon for performing various computer-implemented operations that embody a part of an apparatus, system or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

The invention claimed is:

1. A method of configuring a subscriber identity device for use at a terminal for communication with a communication network, the method comprising:
    transferring terminal profile information to the subscriber identity device, the terminal profile information assigning a host processor of the terminal a communication procedure for effecting said communication with the communication network;
    selecting a subscriber identity application of the subscriber identity device for execution on a processing unit of the subscriber identity device;
    following the execution, accessing a toolkit file of the subscriber identity device;
    detecting whether the toolkit file assigns the communication procedure to a modem of the terminal and thereby creates a conflicting assignment of the communication procedure to the modem and the host processor, wherein the host processor compares a portion of the terminal profile information that corresponds to an assignment of the communication procedure to a portion of the toolkit file that corresponds to the assignment of the communication procedure; and
    when the conflicting assignment is detected, resolving the conflicting assignment by resetting the portion of the terminal profile information that corresponds to the assignment of the communication procedure and transferring an updated terminal profile information to the subscriber identity device.

2. A method according to claim 1 wherein the terminal profile information and the updated terminal profile information is transferred to the subscriber identity device by instigating at least one respective write command to the modem, responsive to which the modem writes the terminal profile information and the updated terminal profile information to the subscriber identity device.

3. A method according to claim 2 wherein each respective write command is an AT command.

4. A method according to claim 3 wherein each respective write command is an AT+CUSATW command.

5. A method according to claim 1 wherein the toolkit file is accessed by instigating one or more read commands to a modem, responsive to which the modem reads the toolkit file on the subscriber identity device.

6. A method according to claim 5 wherein the read commands are AT commands.

7. A method according to claim 6 wherein the read commands are AT+CUSATR commands.

8. A method according to claim 1 wherein the communication network is a UMTS network and the application is one of a USIM application and an ISIM application.

9. At least one non-transitory computer readable medium storing executable code configured when executed to implement the method of claim 1.

10. A terminal for communication with a communication network comprising:
    an interface for connecting to a modem;
    a host processor configured to transfer terminal profile information to a subscriber identity device for use at the terminal, the subscriber identity device comprising computer storage configured to store a subscriber identity application, a processing unit operable to provide access to the communication network by executing an instance of the subscriber identity application;
    wherein the transferred terminal profile information assigns a host processor of the terminal a communication procedure for effecting said communication with the communication network; and
    wherein the host processor is further configured to select the subscriber identity application for execution on the processing unit of the subscriber identity device, access a toolkit file, following the execution, to detect whether the toolkit file assigns the communication procedure to the modem and thereby creates a conflicting assignment of the communication procedure to the modem and the host processor, compare a portion of the terminal profile information that corresponds to an assignment of the communication procedure to a portion of the toolkit file that corresponds to the assignment of the communication procedure, and when the conflicting assignment is detected, resolve the conflicting assignment by resetting the portion of the terminal profile information that corresponds to the assignment of the communication procedure and transferring an updated terminal profile information to the subscriber identity device.

* * * * *